United States Patent [19]

Twiestmeyer

[11] 4,192,524
[45] Mar. 11, 1980

[54] TRAILER HITCH APPARATUS

[76] Inventor: Terry B. Twiestmeyer, R.R. #1, Belgrade, Nebr. 68263

[21] Appl. No.: 873,806

[22] Filed: Jan. 31, 1978

[51] Int. Cl.² .............................................. B60D 1/00
[52] U.S. Cl. .................................. 280/415 A; 280/505
[58] Field of Search ............... 280/501, 500, 502, 505, 280/495, 491 A, 482, 415 R, 415 A; 293/69 R

[56] References Cited

U.S. PATENT DOCUMENTS

| | | | |
|---|---|---|---|
| 2,719,733 | 10/1955 | Riemann | 280/501 |
| 2,893,753 | 7/1959 | Baker | 280/501 |
| 3,717,362 | 2/1973 | Johnson | 280/500 |
| 3,718,347 | 2/1973 | Mann | 280/482 |

FOREIGN PATENT DOCUMENTS 534550  12/1956  Canada ........................ 280/501

*Primary Examiner*—John A. Pekar
*Attorney, Agent, or Firm*—Henderson & Sturm

[57] ABSTRACT

A selectively convertible trailer hitch device is disclosed which is readily adapted for attachment to the rear bumper plate and the longitudinal frame members of most commonly used towing vehicles. The trailer hitch device includes a support frame having a built-up bottom section with a horizontal slot formed therethrough which is accessible to a slidably mounted draw bar. The draw bar has a plurality of longitudinally spaced holes drilled therethrough and a ball hitch mounted in one of the holes. At each side of the support frame is a rod and turnbuckle device interconnecting the support frame to the longitudinal frame members of the towing vehicle for transferring at least a part of the load carried by the draw bar from the bumper plate to the longitudinal frame members.

7 Claims, 5 Drawing Figures

TRAILER HITCH APPARATUS

BACKGROUND OF THE INVENTION

This invention generally relates to a trailer hitch device and more specifically to a hitch device which is selectively convertible from a ball type unit to a clevis pin unit and which further provides the transfer of the load from the bumper plate to the longitudinal frame members of the towing vehicle.

Trailers and trailer hitches are common throughout the world; however, in the agricultural producing areas the trailer is used for a plurality of different types of services wherein there is a considerable difference in the weight and the distribution of the load carried by the trailer. The ideal hitch device should be disposed at the proper height to properly receive the tongue of the trailer, it should be adapted to receive either a clevis or a ball type unit and it should be extremely durable and properly mounted to carry substantially any load placed thereon.

An extremely heavy load or improperly balanced load places considerable weight on the hitch device. Generally, the hitch device is secured to the bumper plate on pickup trucks and that plate is not designed for unusual weight distributions. Therefore, it is desirable to provide an adjustable link between the bumper plate and the frame to provide for the transfer of the weight from the bumper plate to the horizontal frame. Any link would possibly accomplish the necessary transfer; however, the installation of that link is extremely difficult and not always satisfactory.

There are numerous trailer hitch devices but none of those presently available in the market place are designed to overcome all of the disadvantages described hereinabove.

SUMMARY OF THE INVENTION

It is therefore a primary object of this invention to provide a novel trailer hitch.

It is another object of this invention to provide an improved trailer hitch device which is safe and convenient to operate, and which is accessible to either ball or clevis pin type trailer tongues.

It is a further object of this invention to provide a trailer hitch which will withstand the added pressure of the trailer by selectively transferring part of or all of the load from the bumper plate to the frame of the towing vehicle.

It is a still further object of this invention to provide a selectively convertible hitch device that is economical to manufacture, simple in use and design, and rugged in construction.

These and other objects are accomplished by providing a selectively convertible trailer hitch device which is readily adapted for attachment to the rear bumper and frame of most commonly used towing vehicles. The trailer hitch apparatus includes generally a support frame having a built up bottom section with a horizontal slot formed therethrough accessible to a slidably mounted draw bar. The draw bar has a plurality of longitudinally spaced holes drilled therethrough and a ball hitch is mounted in one of the end holes. The support frame is secured at the top with bolts to the bumper plate of the vehicle and at each side of the support frame is a rod and turnbuckle device interconnecting the support frame to the longitudinal frame members of the towing vehicle for transferring part of or all of the weight of the towed load from the bumper plate to the longitudinal frame members.

BRIEF DESCRIPTION OF THE DRAWINGS

The advantages of the invention will become apparent upon consideration of the following detailed disclosure of the invention, especially when taken in conjunction with the accompanying drawings wherein.

DESCRIPTION OF THE PREFERRED EMBODIMENT

Figure 1:
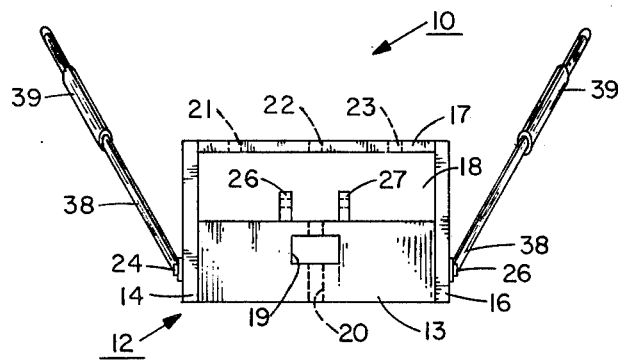
FIG. 1 is a front elevational schematic view of the trailer hitch device showing the general arrangement of the elements.
Figure 2:
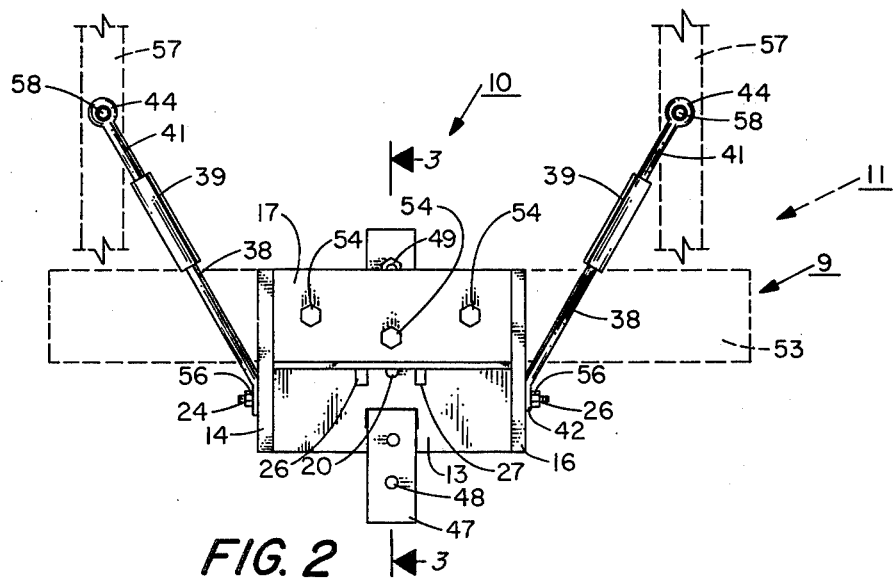
FIG. 2 is a bottom plan view of the trailer hitch device attached to a towing vehicle partially shown in broken line.
Figure 3:
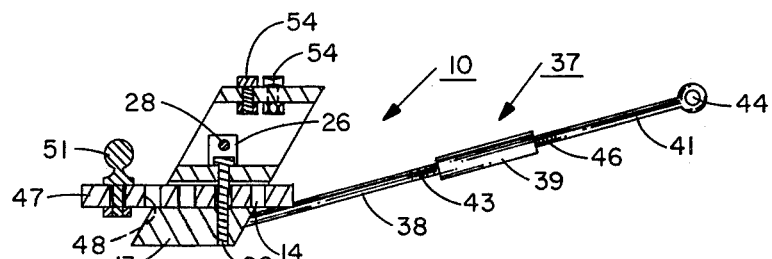
FIG. 3 is a sectional view thereof taken along lines 3—3 in FIG. 2.
Figure 4:
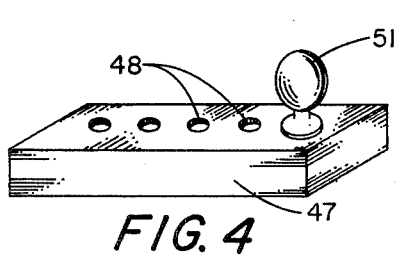
FIG. 4 is an enlarged perspective view of the draw bar.

Referring now to the drawings, and in particular to FIGS. 1-3, the trailer hitch device of this invention is indicated generally at 10, and is shown in assembled relation with portions of a towing vehicle assembly 11.

The trailer hitch device 10 (FIGS. 1 and 3) includes a support frame 12 having a reinforced bottom wall 13, a pair of side walls 14 and 16, and a top wall 17. The top wall 17 is spaced from the bottom wall 13 to provide an opening 18 therebetween. It will be noted in FIG. 3 that the bottom wall 13 is spaced rearwardly of the top wall and the side walls are angled to accommodate this positioning. The bottom wall 13 occupies approximately one half the depth of the frame and has a horizontally disposed passage 19 formed therethrough from front to rear. A hole 20 is drilled through the bottom wall from top to bottom and passes through the passage 19. Three vertically disposed holes 21-23 are formed through the top wall and a mounting bolt 24 and 26 is secured to and projects from each side wall 14 and 16.

Figure 5:
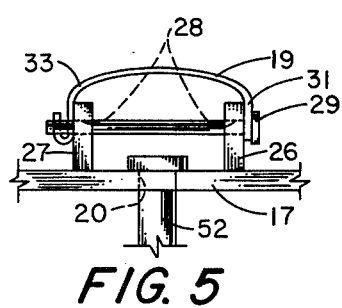
FIG. 5 is an enlarged, partial, front elevational view of the locking device.

Affixed to the top of the bottom wall 13 (FIGS. 1 and 5) are a pair of tabs 26 and 27. The tabs are mounted opposite each other with the hole 20 disposed therebetween. Each tab has a hole 28 (FIGS. 3 and 5) formed therethrough, which holes 28 are in alignment to receive a locking pin 29. One end 31 of a spring clip 32 is secured to the head end of the pin 29 and the other end 33 is hooked to releaseably engage the shank end of the pin.

Secured to each bolt 24 or 26 is a linkage 37 (FIGS. 2 and 3). As each linkage 37 is identical only one will be described however like parts of each will be identically identified. The linkage 37 includes a rod 38, a turnbuckle 39 and a stub rod 41. The rod has an eye 42 formed on one end thereof and threads 43 turned on the other end thereof. The turnbuckle 39 is tubular in shape and the internal diameter is tapped on each end. The stub rod 41 has an eye 44 formed on one end thereof and threads 46 turned on the other end thereof. The turnbuckle 39 threadably receives the threaded ends of the rods 38 and 41.

Reversibly mounted in the passage 19 (FIGS. 2 and 3) is a draw bar 47. A plurality of longitudinally aligned holes 48 are drilled vertically through the draw bar. Affixed to the draw bar at an end hole 48 by a nut 49, is a conventional ball unit 51. The draw bar is secured in the passage 19 by a drop pin 52 (FIGS. 3 and 5) disposed in the hole 20 and one of the holes 48 and the drop pin 52 is retained in the above mentioned holes by the locking pin 29.

Installation of the hitch device on a towing vehicle is made relative simple because of the linkage 37. Holes are drilled through a bumper plate 53 (FIG. 2) and the frame 11 is secured thereto by bolt and nut assemblies 54 which extend through the holes 21-23 in the top plate. The eye 42 of the rod 38 is disposed on the bolt 26 and secured thereto by a nut 56. The turnbuckle is positioned on the rods 38 and 41 wherein it can be turned in either direction to provide a shorter or longer length to the linkage 37. The eye 44 of each of the stub rod is used to mark the position for drilling a hole in the longitudinal frame members 57 and then secured to that member by a bolt and nut assembly 58. The turnbuckle is then turned to provide the proper length for the linkage. This length thus prevents the bumper plate from being damaged or bent by an excessive weight on the drawbar. Note, that the turnbuckle structure of the instant linkage 37 can withstand both tension and compression loads.

As some towed vehicles utilize a ball hitch unit and others require a clevis pin arrangement the universality of the hitch device 10 becomes apparent. Essentially, to switch from the ball hitch to the clevis pin the drawbar 47 is reversed end to end and if desired inverted, thus presenting a hole 48 to the tongue of a towed vehicle in the one instance and a ball 51 in the other. The ball hitch position of the drawbar 47 is shown in FIG. 3, while the clevis pin position is shown in FIG. 2. To switch from the ball hitch position, the drawbar 47 is first extracted from the passage 19 by releasing locking pin 29 and removing drop pin 52. Drawbar 47 is then reversed end to end, and inverted so that ball hitch 51 points downwardly. The drawbar 47, thus positioned, is then inserted into passage 19 from the rear, the drawbar 47 being fully inserted to extend outwardly at the front of passage 19 presenting holes 48 to receive a clevis pin hitch as shown in FIG. 2.

The drawbar 47 is then secured within passage 19 by inserting drop pin 52 and installing locking pin 29. The operation is simply reversed to switch from the clevis pin hitch back to the ball hitch. Thus, the Trailer Hitch Apparatus of the instant invention is suitable for attachment to a trailer having either a bolt or clevis pin hitch.

It is understood that various changes in the details, materials, and arrangement of parts which have been described and illustrated in order to explain the nature of the invention, will occur to and may be made by those skilled in the art upon a reading of the disclosure wherein the principles and scope of the invention.

I claim:

1. A trailer hitch device for attachment to a bumper plate of a towing vehicle, the vehicle further having frame members disposed distal of said bumper plate, the device comprising:

support frame means for attachment to said bumper plate;

a draw bar means secured to said support frame means; and elongated linkage means having one end secured to said support frame means and having another end for attachment to said frame members; wherein said support frame means has a horizontally disposed passage formed therethrough from front to rear and said draw bar means is disposed in said passage, said draw bar means having a ball hitch secured thereto, said draw bar means also having at least one opening formed therein for receiving a clevis pin, said support frame means including a reinforced bottom wall, a pair of spaced side walls secured to and projecting upwardly from said bottom wall, and a top wall secured between said sidewalls and spaced from said bottom wall, said bottom wall having said passage formed therethrough and further having a vertical hole drilled therethrough and passing into said passage; and said draw bar means including a drop pin mounted in said vertical hole and one of said draw bar openings, and wherein said support means includes a pair of spaced upstanding tabs secured to the top of said bottom wall with said tabs opposite each other with said vertical hole disposed therebetween, each said tab having a hole formed therethrough; and a locking pin mounted in said tab holes over said drop pin to prevent said drop pin from working out of said vertical hole.

2. A trailer hitch device as defined in claim 1 further comprising a spring clip secured to said locking pin to prevent said pin from being dislodged from said tab holes.

3. A trailer hitch device for attachment to a bumper plate of a towing vehicle, the vehicle further having frame members disposed distal of said bumper plate, the device comprising:

a support frame means for attachment to said bumper plate;

a draw bar means secured to said support frame means; and elongated linkage means having one end secured to said support frame means and having another end for attachment to said frame members; wherein said elongated linkage means includes a pair of spaced elongate rods, each rigidly secured on one end to said support frame means and each having a second end having threads formed thereon; a pair of internally threaded turnbuckles, mounted on said rod second end respectively; and a pair of stub rods, each having one end threaded for mating with said turnbuckle and each having a second end for rigid securement to the frame members, wherein upon turning each said turnbuckle the length of each said linkage means can be varied.

4. A trailer hitch device as defined in claim 3 wherein said support frame means includes a reinforced bottom wall, a pair of spaced side walls secured to and projecting upwardly from said bottom wall, and a top wall secured between said sidewalls and spaced from said bottom wall, said bottom wall having a horizontally disposed passage formed therethrough from front to rear and said draw bar means is disposed in said passage, and further having a vertical hole drilled therethrough and passing into said passage; and said draw bar means includes a plurality of spaced holes formed therethrough and a drop pin mounted in said vertical hole and one of said draw bar openings.

5. The trailer hitch device as defined in claim 3 wherein said elongated linkage means includes means for withstanding compression and tension forces directed between said support frame means and said frame member.

6. A trailer hitch device for attachment to a bumper plate of a towing vehicle, the vehicle further having frame members disposed distal of said bumper plate, the device comprising:

support frame means for attachment to said bumper plate;

a draw bar means secured to said support frame means; and elongated linkage means having one end secured to said support frame means and having another end for attachment to said frame members; wherein said elongate linkage means includes a pair of spaced elongate rods, each secured on one end to said support frame means and each having a second end having threads formed thereon; a pair of internally threaded turnbuckles, mounted on said rod second end respectively; and a pair of stub rods, each having one end threaded for mating with said turnbuckle and each having a second end for securement to the frame members, wherein upon turning each said turnbuckle the length of each said linkage means can be varied; and wherein said support frame means includes a reinforced bottom wall, a pair of spaced side walls secured to and projecting upwardly from said bottom wall, and a top wall secured between said sidewalls and spaced from said bottom wall, said bottom wall having a horizontally disposed passage formed therethrough from front to rear and said draw bar means is disposed in said passage, and further having a vertical hole drilled therethrough and passing into said passage; and said draw bar means includes a plurality of spaced holes formed therethrough and a drop pin mounted in said vertical hole and one of said draw bar openings; and further wherein said support frame means includes a pair of spaced upstanding tabs secured to the top of said bottom wall with said tabs opposite each other with said vertical hole disposed therebetween, each said tab having a hole formed therethrough; and a locking pin mounted in said tab holes over said drop pin to prevent said drop pin from working out of said vertical hole.

7. A trailer hitch device for attachment to a bumper plate of a towing vehicle, the vehicle further having frame members disposed distal of said bumper plate, the device comprising:

support frame means for attachment to said bumper plate;

a draw bar means secured to said support frame means; and elongated linkage means having one end secured to said support frame means and having another end for attachment to said frame members; wherein said support frame means has a horizontally disposed passage formed therethrough from front to rear and said draw bar means is disposed in said passage, said draw bar means having a ball hitch secured thereto, said draw bar means also having at least one opening formed therein for receiving a clevis pin and wherein said drawbar means has a first end and a second end opposite thereto, and said ball hitch being secured at said first end and said clevis pin openings being formed at said second end, said drawbar means being disposed in said passage in a first position, and then reversed end to end to be disposed in said passage in a second position, in said first position said drawbar being connectable to a trailer by means of said ball hitch, and in said second position said draw bar being connectable to a trailer by means of said clevis pin openings.

* * * * *